(12) United States Patent
Obara (10) Patent No.: US 6,708,232 B2
(45) Date of Patent: Mar. 16, 2004

(54) DATA MIGRATION METHOD, PROTOCOL CONVERTER AND SWITCHING APPARATUS USING IT

(75) Inventor: Kiyohiro Obara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 09/780,411

(22) Filed: Feb. 12, 2001

(65) Prior Publication Data

US 2002/0002638 A1 Jan. 3, 2002

(30) Foreign Application Priority Data

Jun. 29, 2000 (JP) ........................................ 2000-201433

(51) Int. Cl.$^7$ .............................................. G06F 13/14
(52) U.S. Cl. ........................... 710/11; 711/111; 711/114; 711/162; 711/163; 711/165; 711/112; 370/445
(58) Field of Search ........................... 710/11; 711/112, 711/111, 114, 162, 163, 165; 370/445

(56) References Cited

U.S. PATENT DOCUMENTS

| 5,535,375 | A | * | 7/1996 | Eshel et al. .................. 391/500 |
| 5,544,347 | A | | 8/1996 | Yanai et al. |
| 5,680,640 | A | | 10/1997 | Ofek et al. |
| 6,108,345 | A | * | 8/2000 | Zhang .......................... 370/445 |
| 6,108,748 | A | * | 8/2000 | Ofek et al. .................. 711/112 |
| 6,374,327 | B2 | * | 4/2002 | Sakaki et al. ............... 711/112 |
| 6,510,491 | B1 | * | 1/2003 | Franklin et al. ............ 711/114 |
| 6,553,408 | B1 | * | 4/2003 | Merrell et al. ............. 709/213 |
| 6,625,705 | B2 | * | 9/2003 | Yanai et al. ................ 711/162 |

FOREIGN PATENT DOCUMENTS

| EP | 1130514 | 9/1991 |
| JP | 2001-0249853 | 9/2001 |

* cited by examiner

*Primary Examiner*—Abdelmoniem Elamin
(74) *Attorney, Agent, or Firm*—Antonelli, Terry, Stout & Kraus, LLP

(57) ABSTRACT

An online data migration method is provided for transferring data from a computer and an existing storage system using the conventional interface such as SCSI to a new storage system using SAN. The present method comprises the steps of disconnecting the connection between the computer and the first storage system with first interface protocol, connecting the computer to a switch connected to a second storage system with a second interface protocol through first protocol converter having protocol converting facility, connecting the switch to the first storage system through second protocol converter, and migrating data in the first storage system into the second storage system via the switch.

18 Claims, 5 Drawing Sheets

| SCSI NUMBER | LU NUMBER | FIBER CHANNEL ADDRESS (DOMAIN ID, AREA ID, PORT ID) |
|---|---|---|
| 0 | 0 | 0 , 1 , 0 |
| 1 | 0 | 0 , 3 , 1 |
| 1 | 1 | 0 , 3 , 2 |
| ... | ... | ... |
| 6 | 0 | 0 , 14 , 0 |
| 7 | 0 | 0 , 15 , 0 |

DATA MIGRATION METHOD, PROTOCOL CONVERTER AND SWITCHING APPARATUS USING IT

BACKGROUND OF THE INVENTION

The present invention relates to a migration method of the online data in a computer or a host computer (collectively referred to as a "computer" herein below) as well as a storage system, and more particularly to a migration method of the contents of a storage device including data subject to be used in business processing, without interrupting almost all computing. The present invention relates still more particularly to a data migration method from a existing storage system to a new storage system.

When updating an existing storage system into a new one, migrating data stored in the existing storage system into the new storage system is needed, in order to continue to utilize the data used in the processing hitherto. In such a case so far, data stored in the existing storage system would be to be backed up to a tape drive and the like at first, then the data thus backed up would be restored (written back) to the new storage device.

The backing up and restoring method as have been described above may use the processor incorporated in the computer. In order to prevent the consistency of data from being lost during the backing up operation by the alteration of the data to be backed up, any business processing that may use the data to be backed up has to be halted during the backing up operation. The period of time of stopping the business processing may be in general in the order of one to a few days, depending largely on the amount of data to be backed up and restored.

In the business of a recent data center, which is characterized by non-stop service of 24 hours a day, stopping the business processing for data migration in such a storage system may be a condition too difficult to accept. There have been proposed some data migration methods for improving the condition.

For example, a remote data copy method is disclosed in U.S. Pat. No. 5,544,347 wherein first storage system connected to a computer may automatically copy data into second storage system by itself, without intervention of the computer. In this system, data copy operation is hidden from the computer system in order to effectuate data copy into the second storage system without interrupting any business processing in the computer.

When applying this method to the upgrade scheme of storage system, utility is limited because the existing, first storage system has to have the remote data copy function. Also, when the system is operating, the contents of the first storage system is altered by the computer all the time, so that the contents in the second storage system transferred by means of the remote data copy method may not synchronize with any alteration made. In addition, since the existing, first storage system is located in a connection path different from the path connecting the new, second storage system to the computer; the computer may recognize these storage systems as separate volumes. For these reasons, in order to use the data restored on a volume of the new storage system instead of the data on the existing storage system, the business processing program running on the computer has to be updated so as to reassign the volume to be accessed, even if the contents stored are the same.

There has been disclosed an online data migration system in a U.S. Pat. No. 5,680,640, which may solve those problems encountered in case of the remote data copy methods, including the necessity of incorporating the remote copy functionality into the existing first storage system, inability of complete synchronization between the first and second storage systems, needs for updating the program controlling the computer due to the different connection path to the new storage systems, and so on.

In the above patent disclosed, the word "online" indicates that the reference to and alteration of the data subject to be migrated is allowed during migration. The second storage system in this migration system comprises a unit capable to effectuate the data restoration while at the same time allowing the sending/receiving (transfer) of data subject to the processing in progress in the computer. Whereby the computer may recognize the existing, first storage system as if the first storage is still connected thereto. In this system, it should be noted that the connection path between the computer and the existing, first storage system is disconnected and then the second storage system is connected thereto instead. Although the momentary disconnection of the connection path may cause the system to halt, the system may be dealt as being online since the period of time of the disconnection is far and away shorter than the backing up and restoring method as have been described above.

This method implicitly assumes a direct connection between the computer and the storage, namely the peer-to-peer connection, as well as the same interface to the new storage as the existing storage, namely the same communication protocol, resulting in the limited utility of the system.

Recently, a new architecture called the storage area network system (referred to as SAN herein below) has been developed, which interconnects a plurality of storages. In a SAN environment, a fiber channel (FC; referred to as FC below) using an optical fiber or a coaxial cable is used as the interface (communication protocol) for the interconnection. A switching apparatus for FC (referred to as FC switch below) is used in a SAN environment to construct a system with a plurality of computers, a plurality of storage systems, and a plurality of tape drives being interconnected. In this construction, a arbitrary computer may be able to access to a arbitrary storage system, allowing data to be shared. Also, a tape drive may be able to access directly to the storage system, allowing data to be backed up to the tape drive and to be restored from the tape drive to a storage system, without intervention of a computer. From the characteristics as above, the SAN system architecture using the FC for the interface and the FC switch for system construction is expected to be popular in the future.

The U.S. Pat. No. 5,680,640 as have been described above does not expect the online data migration of a storage system in a SAN environment. Japanese Patent Application No. 2000-063289 has newly proposed an online data migration method in the SAN environment. The data migration method disclosed in this application comprises a unit enabling data recording while allowing data input and output (data transfer) to and from the computer in a FC switch or in every storage system. However, in this data migration method the interface, i.e., the communication protocol is limited to the FC. Therefore data migration from the existing storage system to a new storage system is not performed in SAN.

On the other hand, most of the storage systems at present use the SCSI (small computer system interface) interface. If such a conventional interface may be handled on SAN, the utility of SAN will be further improved. Therefore it is highly desirable to implement the online data migration from a system using SCSI and the like to a SAN environment using FC.

SUMMARY OF THE INVENTION

The present invention has been made in view of the above circumstances and has an object to provide an online data migration method from a computer as well as a storage system using such conventional interface as SCSI to a new storage system using SAN, a protocol converter and a switching apparatus using the same.

The object above may be achieved by providing a data migration method comprising the following steps of: disconnecting a connection between a computer performing data transfer by a first communication protocol and a first storage system performing data transfer by the first communication protocol; connecting, through a first protocol converter, the computer to a switch connected to a second storage system performing data transfer by a second communication protocol; connecting, through a second protocol converter, the switch to the first storage system; and migrating, through the switch, data stored in the first storage system into the second storage system, wherein the first and second protocol converters have a protocol converting function for converting the first communication protocol into the second communication protocol and vice versa, the second communication protocol into the first communication protocol.

When implementing the method as have been described above, both the computer and the first storage system can be handled as having the second communication protocol, so as to allow the computer and the first storage system to be handled in the SAN environment.

The effect in accordance with the present invention may be further improved by providing:
the first protocol converter has a first conversion function for converting a second identifier used by the second storage system that performs data transfer by the second communication protocol into a first identifier for performing data transfer by the first communication protocol, and a first translation table for converting between the first and the second identifiers; the first protocol converter, the second protocol converter and the switch form a switching apparatus, the switching apparatus performs data exchange by using the first conversion function so that the computer performing data transfer by the first communication protocol may handle the second storage system as a storage system using the first communication protocol, a second protocol converter has a second conversion function for converting a third identifier used by the first storage system that performs data transfer by the first communication protocol into a fourth identifier for performing data transfer by the second communication protocol, and a second translation table for converting between the third and the fourth identifiers; and the switching apparatus performs data exchange by using the second conversion function so that the second storage system performing data transfer by the second communication protocol may handle the first storage system as a storage system using the second communication protocol.

These and other objects and many of the attendant advantages of the invention will be readily appreciated, as the same becomes better understood by reference to the following detailed description when considered in connection with the accompanying drawings.

DETAILED DESCRIPTION OF THE PREFERRED EMBODIMENTS

A detailed description of one preferred embodiment of a data migration method as well as a protocol converter and a switching apparatus using the same embodying the present invention will now be given referring to the accompanying drawings.

Figure 1:
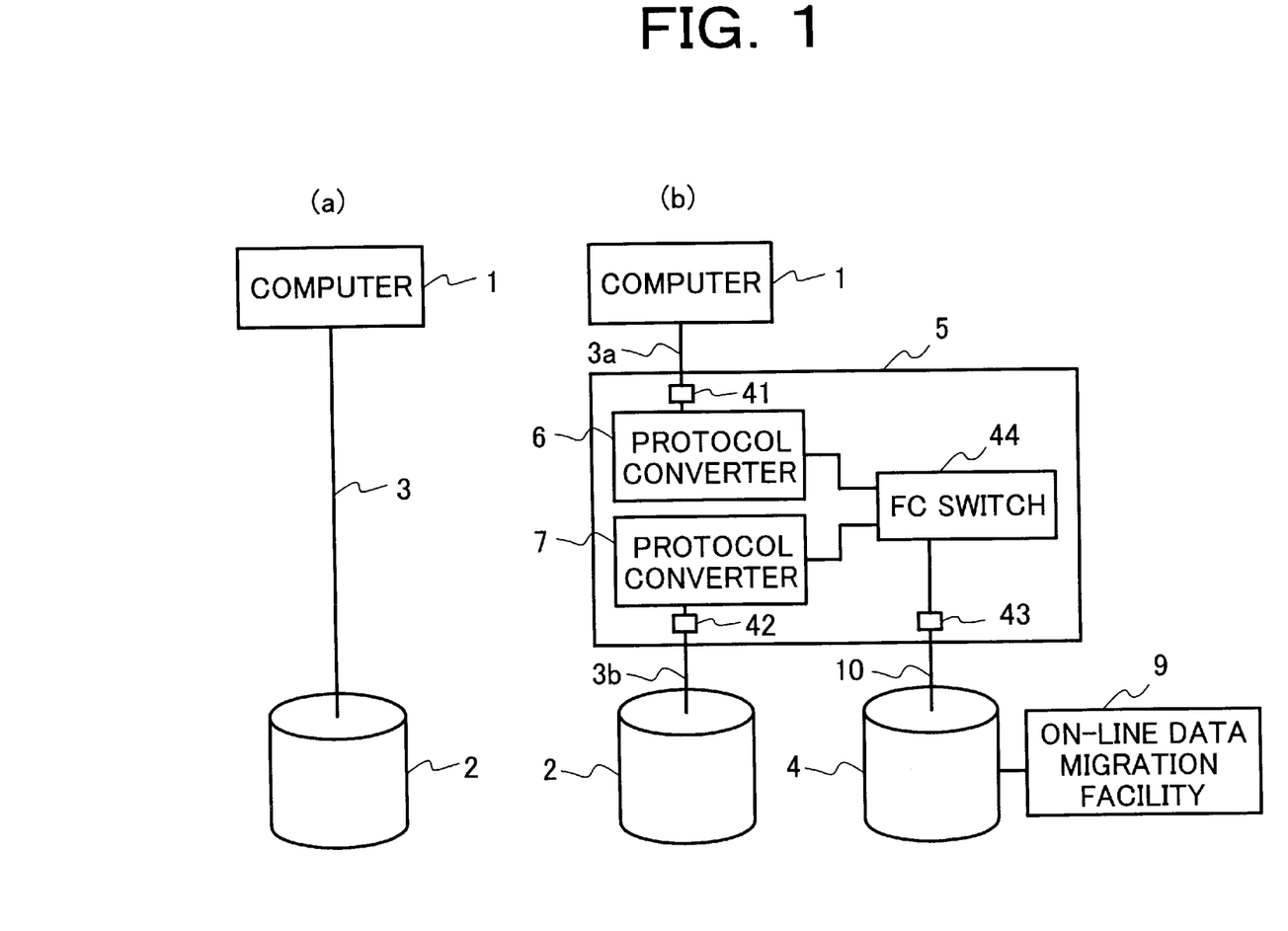
FIG. 1 is a schematic block diagram of a computer system illustrating a preferred embodiment of the data migration method in accordance with the present invention.

Part (a) of FIG. 1 shows a schematic block diagram of a computer system prior to the data migration. A computer 1 is connected to an old (existing) storage system 2 via a path 3. The interface protocol used in the path 3 maybe SCSI standard, in particular a parallel transfer SCSI standard for the parallel transfer of a plurality of bits on copper wirings. It should be noted here that the standard used in the path 3 in accordance with the present invention is not limited thereto.

The data migration may be performed by at first disconnecting the connection between the computer 1 and the old storage system 2, and inserting a switching apparatus having the protocol conversion function therebetween. Part (b) of FIG. 1 shows an exemplary system configuration after accommodation. The path 3 is separated into a path 3a and a path 3b, between which a switching apparatus 5 is inserted.

The switching apparatus 5 comprises an FC switch 44, a protocol converter 6 (mapping facility) provided in a port 41 for attaching the computer 1, a protocol converter 7 provided in a port 42 for attaching the old storage system 2. A new storage system 4 for data to be migrated is attached to the FC switch 44 through a path 10 and a port 43. The protocol converters 6 and 7 will be described later.

The new storage system 4 has an online data migration facility 9, which facility will also be described later. The online data migration facility 9 may otherwise be provided in the switching apparatus 5, with which the object of the present invention may similarly be achieved.

An FC switch is a facility connected to a plurality of computers and a plurality of storage systems, in order to connect an arbitrary computer among them to an arbitrary storage system, or to connect an arbitrary storage system to another arbitrary storage system by means of switching (exchanging). In the preferred embodiment of the present invention, it is assumed that the number of computers connected to the FC switch 44 is one and the storage systems connected to the FC switch 44 is two.

For the interface protocol of the path 10, FCP protocol is used, which maps (accommodates) SCSI protocol onto the FC protocol. These protocols are standardized by ANSI (American National Standards Institute).

Basic operation of the FC switch 44 is to accept a frame arriving to a port to output to an output port instructed by the header of the frame. This operation is regulated by the FC standard defined by ANSI. In the switching apparatus 5, in addition to this switch operation, the protocol converter 6 functions for the port 41 to the computer 1, as well as the protocol converter 7 functions for the port 42 to the storage system 2. More specifically, the switching apparatus 5 is comprised of the protocol converters 6 and 7 in addition to a general FC switch 44 defined by the standard.

The protocol converter 6 is a facility that maps the storage system 4 connected to the FC switch 44 so as to be handled by the computer 1 as similar to the devices on the parallel SCSI path 3 shown in part (a) of FIG. 1. The mapping converts the communication protocol. In the present specification the computers and storage systems and the like may be collectively referred to as devices.

Figure 3:
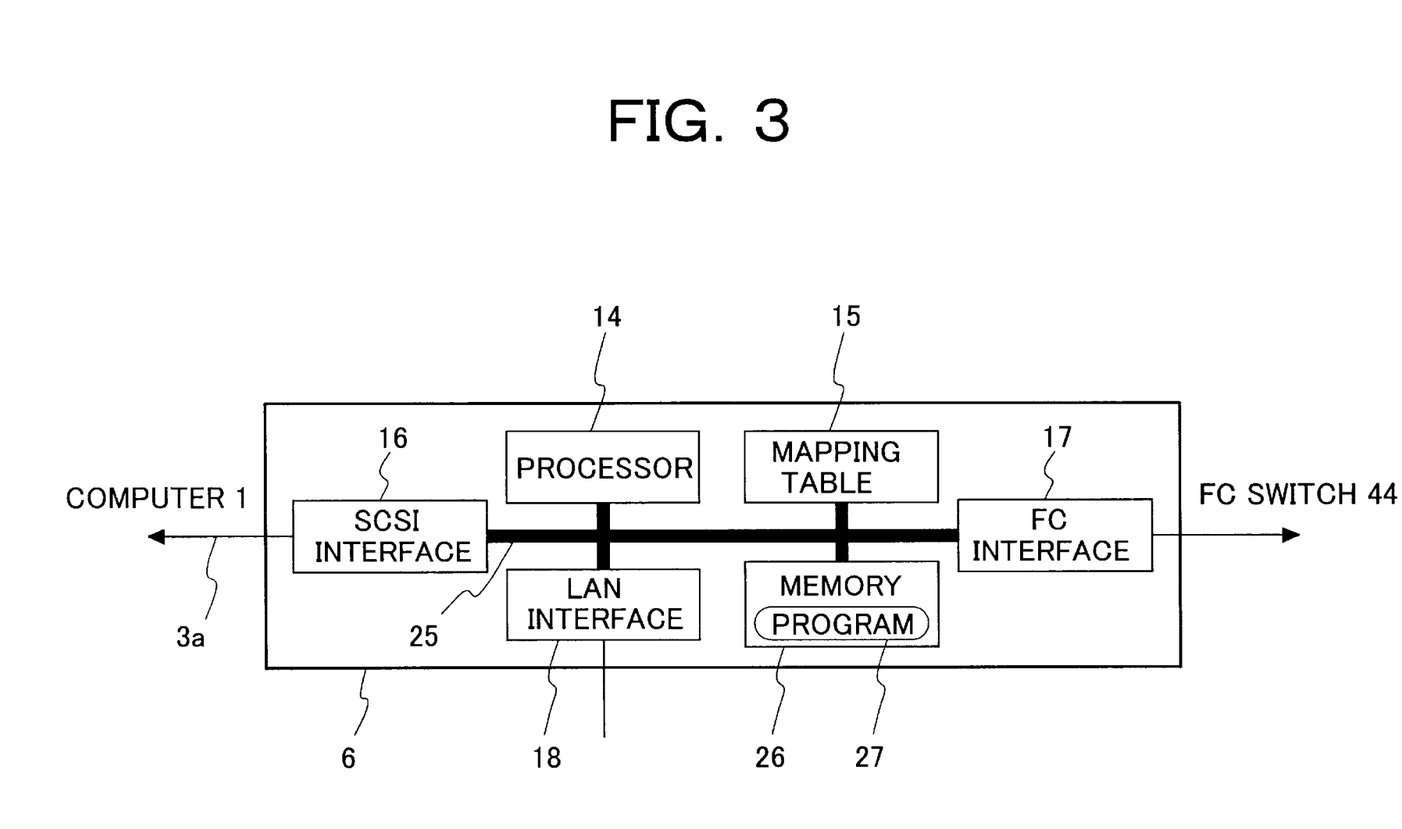
FIG. 3 is a schematic block diagram illustrating a protocol converter attached to a computer.

The configuration of a protocol converter 6 is shown in FIG. 3. The protocol converter 6 comprises a processor 14, a mapping table 15, a SCSI interface unit 16, an FC interface unit 17, a LAN interface unit 18, a memory 26 for storing a program 27 that controls the processor 14, and an internal bus 25 for interconnecting these components.

The mapping table 15 is a table for mapping (accommodating) devices on the parallel SCSI to devices on the FC. The protocol converter 6 maps the new storage system 4 connected to the FC switch 44, based on the information from the mapping table, to allow the computer 1 to handle the new storage system 4 as similar to devices on the parallel SCSI of the path 3 shown in part (a) of FIG. 1.

Figure 2:
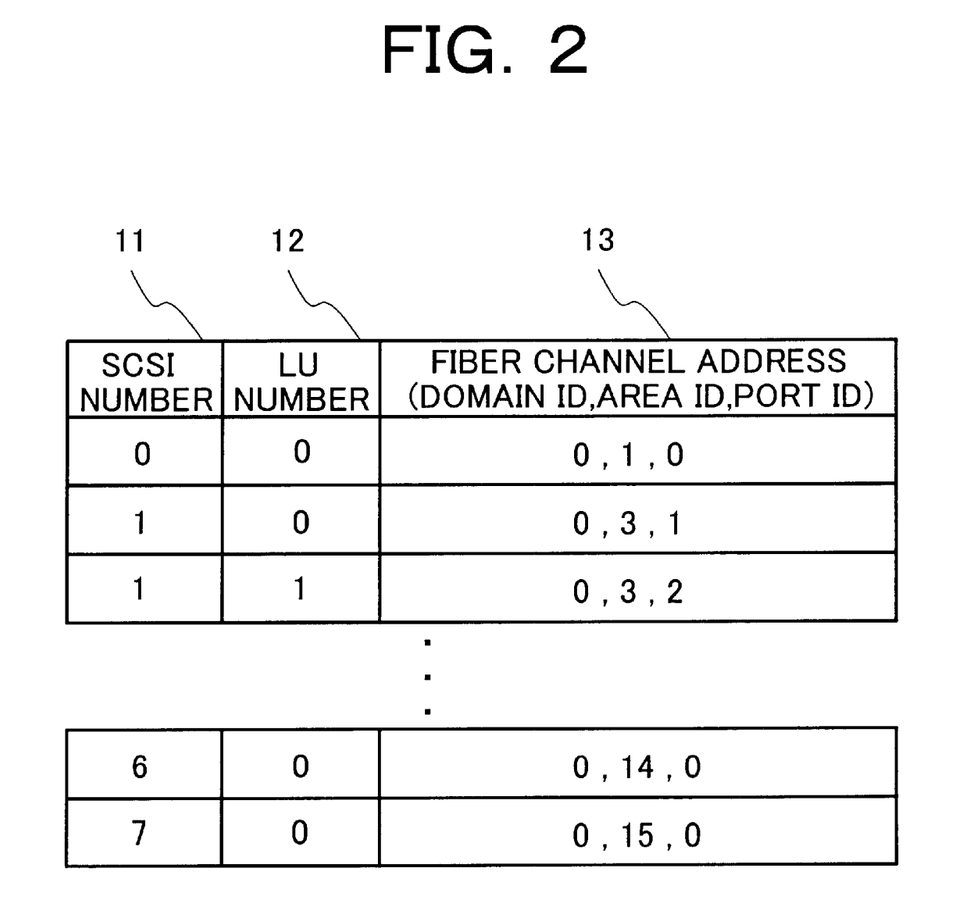
FIG. 2 is an exemplary schematic diagram illustrating an example of mapping table used in a protocol converter in accordance with the present invention.

FIG. 2 shows the structure of the mapping table 15. The mapping table 15 includes a field 11 containing a SCSI number, a field 12 containing a LU (logical unit) number, and a field 13 containing a fiber channel address. The LU number is a identifier number for identification of devices having the identical SCSI number.

The fiber channel address is composed of a domain ID, an area ID, and a port ID. The domain ID is an identifier number of switches when cascading the FC switches, however in the preferred embodiment of the present invention a fixed number is allocated because there is only one FC switch used. The area ID is an identifier number of switch ports, and the port ID is an identifier number of plural devices connected to one single port. By using the fiber channel address scheme, any device connected to the FC switch may be assigned. The details of the address system are defined in the FC-SW, a fiber channel standard developed by ANSI.

In the example of the mapping table 15 shown in FIG. 2, a FC device (number 0) connected to the port number 1 is mapped to the LU number 0 and the SCSI device number 0 of the parallel SCSI, another device (number 1) connected to the port number 3 is mapped to LU number 0 and the SCSI device number 1 of the parallel SCSI, and still another device (number 2) of the FC connected to the port number 3 is mapped to the LU number 1 and the SCSI device number 1 of the parallel SCSI.

Operation of the protocol converter 6 will be now described in greater details. The SCSI interface unit 16 receives a command from the computer 1 to a device having an arbitrary SCSI number. The command received is analyzed by the processor 14 to obtain the SCSI number and LU number of the destination. The processor 14 looks up the mapping table 15 to find thus obtained numbers to determine a fiber channel address of the FC device of the mapping destination. Then the processor 14 generates FCP command data equal to the received command for thus obtained fiber channel address to pass the command through the FC interface unit 17 to the FC switch 44. The FC switch 44 then routes the received data to the target port. A command may be thereby sent to storage (the new storage system 4 in the example shown in part (b) of FIG. 1) on the FC subject to be mapped.

The command response returned from the storage 4 on the FC is passed to the computer 1 in accordance with the following steps.

The FC interface unit 17 via the FC switch 44 receives data as an FCP command from the storage 4 on the FC. Thus received FCP command is analyzed by the processor 14 to obtain the SCSI number and LU number of the destination. The processor 14 then looks up the mapping table 15 based on the obtained numbers to find out the SCSI number and LU number of the mapping destination (which is the computer 1 in this example). Furthermore, the processor 14 generates a SCSI command equal to the received command to thus obtained SCSI number and LU number to transmit on the path 3a via the SCSI interface unit 16. The command thereby is passed to the computer 1.

The storage system on the FC is mapped to the parallel SCSI based on the operation as have been described above of the protocol converter 6. The program 27 stored in the memory 26 controls the operation of the processor 14.

There are several ways to configure the data in the mapping table 15. Some approaches will be explained herein below.

One candidate is to configure data from the computer 1 through the SCSI interface unit 16. In this case, since there exists no command defined in the existing SCSI command for manipulating the mapping table 15, an undefined SCSI command or user defined command is used for defining a mapping table manipulating command. The processor 14 interprets such a mapping table manipulating command in order to add or update the contents of the mapping table 15.

In a similar manner, it may be possible to implement another way to configure by the computer or devices attached to the FC switch 44 through the FC interface unit 17 and the FC switch 44. In this case, as similar to the preceding approach through the SCSI interface unit 16, since there is no mapping table manipulating command defined in the existing FCP command, an undefined FCP command or user defined command is used for defining a mapping table manipulating command.

The mapping table may be manipulated through a LAN connection by using such protocols as telnet, http for World Wide Web, or SNMP (simple network management protocol) when a LAN interface unit 18 is provided to the protocol converter 6. In this case, the command system may be arbitrarily defined, and the processor 14 interprets the protocol used and the command in order to add or update the contents of the mapping table 15.

By way of a variety of configuration schemes as have been described above, the contents of the mapping table may be reconfigured from a computer including the system configuration management software, and devices as well as a human operator.

Next, the protocol converter 7 is a facility that maps the devices connected to the parallel SCSI interface to devices connected to the FC switch 44 so as to be handled as similar to the devices on the FC interface. The mapping converts the communication protocol used.

Figure 4:
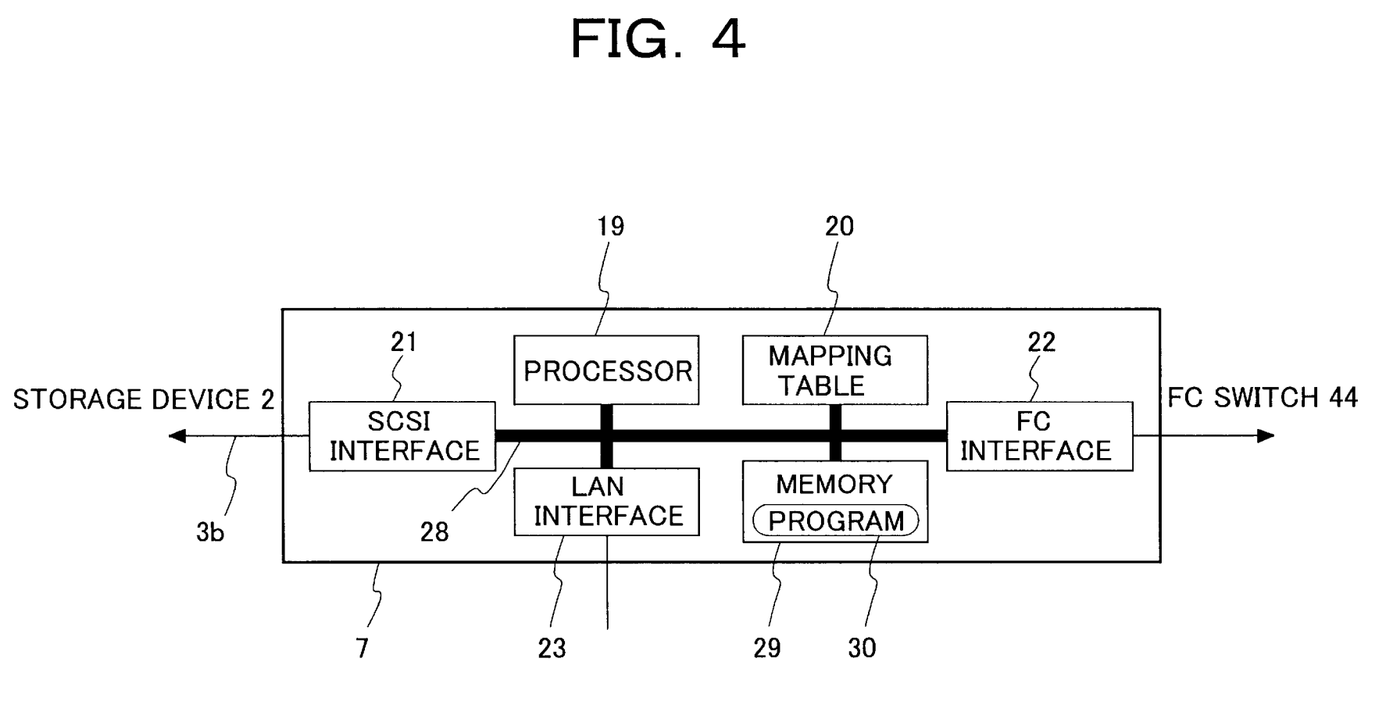
FIG. 4 is a schematic block diagram illustrating a protocol converter attached to a storage system.

FIG. 4 shows the configuration of a protocol converter 7. The protocol converter 7 is comprised of a processor 19, a mapping table 20, a SCSI interface unit 21, an FC interface unit 22, a LAN interface unit 23, a memory 29 for storing a program 30 for controlling the processor 19, and an internal bus 28 interconnecting these components. This configuration is basically identical to the protocol converter 6 above.

The mapping table 20 has the same structure as the mapping table 15 in the protocol converter 6. Based on the information contained in the table, the protocol converter 7 maps the devices on the parallel SCSI interface so as to be able to handle as similar to FC interface devices.

The fundamental operation of the protocol converter 7 is also identical to the protocol converter 6.

Data as an FCP command originated from a device connected to the FC switch 44 is received by the FC interface unit 22 via a switch. The received FCP command is analyzed by the processor 19 to obtain the SCSI number and LU number of the destination. The processor 19 looks up the mapping table 20 to find thus obtained numbers to determine the SCSI number and LU number of the mapping destination. The processor 19 further generates a SCSI command equal to the received command for the determined SCSI number and LU number and transmits onto the path 3b by using the SCSI interface unit 21. The command thereby is passed to the old storage system 2, which is a parallel SCSI device.

The command arrived from the storage system 2 of the type parallel SCSI interface is received by the SCSI interface unit 21. The received command is analyzed by the processor 19 to obtain the SCSI number and LU number of the destination. The processor 19 then looks up the mapping table 20 to find those obtained numbers to determine the fiber channel address of the device of the mapping destination on the FC interface. The processor 19 further generates data of FCP command which is equal to the received command for the determined fiber channel address to pass to the FC switch 44 through the FC interface unit 22. The FC switch 44 in turn routes the received data to the target port in accordance with the protocol defined by the standard. The command thereby is passed to a device on the FC interface subject to be mapped.

The configuration scheme of data in the mapping table 20 is identical to the case of the protocol converter 6.

The operation of the online data migration will be now described herein below in greater details. The online data migration is a technology of copying data from an existing old storage into a new storage, while continuing the read/write (i.e., online) of the data from a computer to the storage. The method in accordance with the present invention allows data access from the host computer 1 to a storage to be continued while at the same time the contents of the old storage system 2 is copied to the new storage system 4.

As the first step of the online data migration, the system is set such that a command from the computer 1 is sent to the new storage system 4. The modification of the destination of commands as have been described above may be achieved by allocating the values of SCSI device number and LU number in the new storage system 4 to the same values as the old storage system 2 has been used. On the other hand, the values of the SCSI device number and LU number in the old storage system 2 is moved to given value set that is not used by any devices attached to the FC switch 44.

Then, the stored contents is copied from the old storage system 2 to the new storage system 4.

When a read request command from the computer 1 is issued during copying the storage contents, if the target data is already coped to the new storage system 4 (including the case in which the data is stored by the write request command originated from the computer 1), data is read out from the new storage system 4 and returned to the computer 1. If otherwise the data is not yet copied to the new storage system 4, the data is read out from the old storage system 2, then copied to the new storage system 4 and returned to the computer 1 at the same time. When a write request command from the computer 1 is issued, data is stored to the new storage system 4. At the moment where any data stored in the old storage system 2 has been all copied to the new storage system 4, the online data migration operation is terminated.

The online data migration may be achieved by providing a function that copies the stored contents of the old storage system 2 to the new storage system 4, and a function that determines whether or not the data requested by a command issued by the computer 1 is either on the old storage system 2 or the new storage system 4 to return data to the computer 1 by reading out from either storage system containing the target data.

These functions may be executed on the new storage system 4 by the online data migration facility 9 provided by the new storage system 4. If the online data migration facility is provided on the FC switch 44, these functions may instead be executed on the FC switch 44.

In case of the preferred embodiment in accordance with the present invention in which the functions are executed on the new storage system 4, the online data migration facility 9 maintains a data mapping table (not shown in the figure) for recording which data is copied and which data is not copied from the old storage system 2 to the new storage system 4. Based on this data mapping table, data copy from the old storage system 2 to the new storage system 4 is executed at the same time, as the data mapping table is updated. The determination of the location of data requested by the computer 1 is performed based on this table, thereby it becomes possible to return the target data to the computer 1 by reading out from either storage system containing the target data.

In case in which the operation is executed on the FC switch 44, a table is maintained in the FC switch 44 for recording which data is copied and which data is not from the old storage system 2 to the new storage system 4. Based on this table, data copy from the old storage system 2 to the new storage system 4 as well as the table update is executed. Also, the determination of the location of data requested by the computer 1 is performed based on this table, thereby it becomes possible to return the target data to the computer 1 by reading out from either storage system containing the target data.

The present invention implements the protocol converter 6 and 7 to handle devices belonging to another different interface as devices of arbitrary identifier number (SCSI device number and LU number), in addition to the online data migration operation as have been described above, in order to allow online data migration between those devices belonging to different interfaces.

Figure 5:
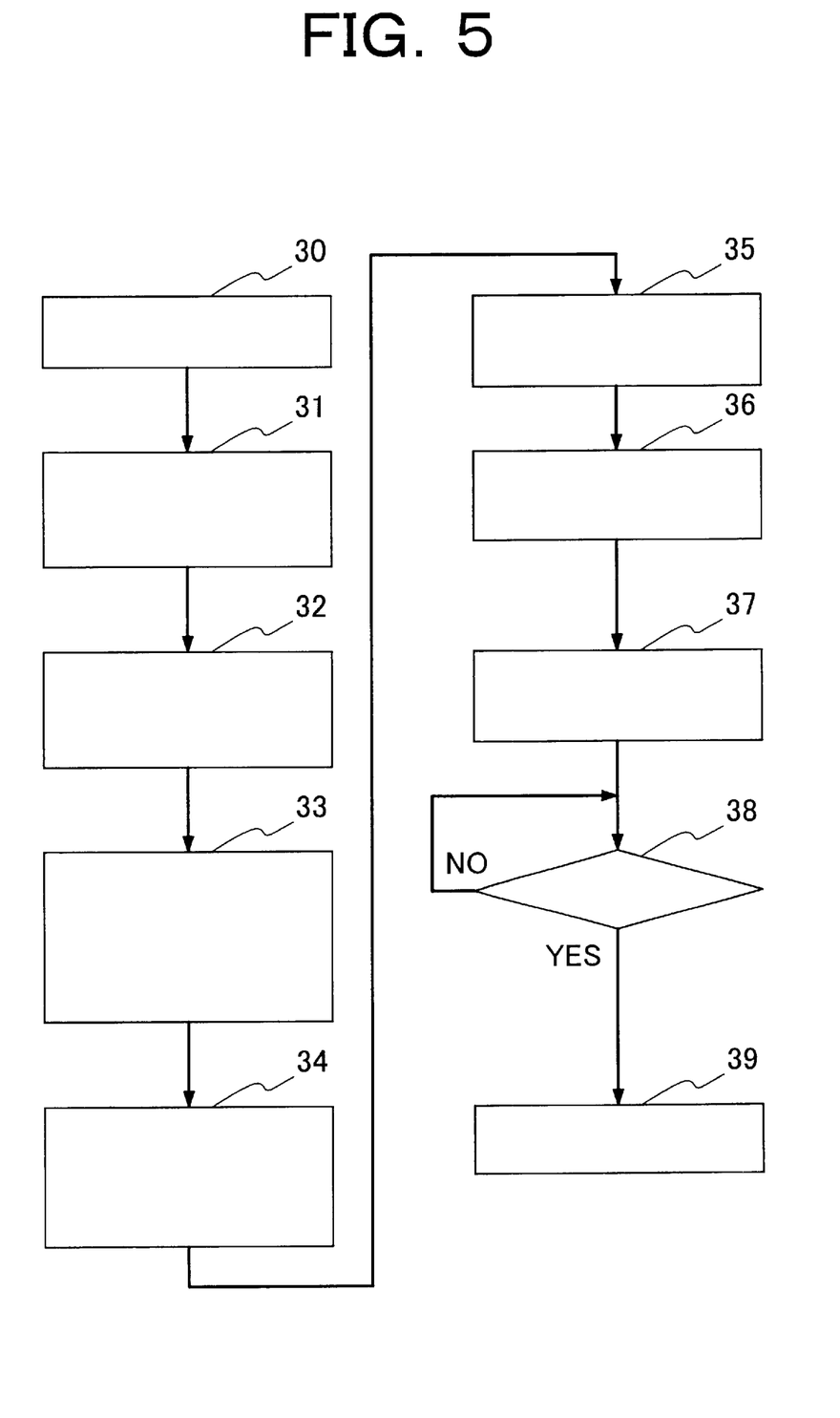
FIG. 5 is a flow chart illustrating the data migration steps in accordance with the present invention.

More practical steps in the online data migration in accordance with the present invention by using the functions as have been described above, in particular the steps of migrating data from the system shown in part (a) of FIG. 1 to that of part (b) of FIG. 1 will be now described in greater details with reference to FIG. 5.

At first, business processing programs run on the host computer 1 is halted (step 30). Here, although not all business processing programs do need to be halted, at least business processing programs that may make use of the old storage system 2 should be terminated.

Next, the switching apparatus 5 is inserted in-between the path 3 connecting the computer 1 to the old storage system 2 (step 31). Here the system should be configured such that the protocol converter 6 is connected to the port to the computer 1, and the protocol converter 7 is connected to the port to the storage system 2. The appearance of the system at this moment is identical to that shown in part (b) of FIG. 1.

Then the values of SCSI number and LU number allocated to the new storage system 4 is now reallocated to the values used by the old storage system 2 (step 32). In addition, by reconfiguring the contents of the mapping table 15 in the protocol converter 6, the new storage system 4 is set so as to have the same values of SCSI number and LU number as the old storage system 2 (step 33). From these settings, the commands from the computer 1 is passed to the new storage system 4.

For the values of SCSI number and LU number of the old storage system 2, any values may arbitrarily be reallocated which are not being used by other devices connected to the FC switch 44 (step 34). In addition, the information thereon is set in the mapping table 20 in the protocol converter 7 such that the new storage system 4 may recognize the old storage system 2 as a device on the FC switch 44 (step 35).

Now the online data migration facility 9 is executed (step 36). By this facility, data copy from the old storage system 2 to the new storage system 4 is started. At this moment any halted business processing programs on the computer 1 may be resumed (step 37). Though the access to the storage system begins again thereby, the online data migration facility intercepts and analyzes the access commands issued from the computer 1, so that the data already copied is read out from the new storage system 4 while data not yet copied thereto is read out from the old storage system 2 to be returned to the computer 1.

When the data copy is finished (step 38), the old storage system 2 is disconnected (step 39). In this condition no access to the old storage system 2 is arrived so that the business processing programs on the computer 1 do not need to be stopped again.

In accordance with the above steps, the online data migration from a computer and existing storage system using the conventional interface such as parallel SCSI and the like to a new storage system implementing the FC and using FC switch may be accomplished.

It should be noted that in the above description, the protocol converters 6 and 7 have been described assumed to be integrated into the switching apparatus 5. However, it is possible that the protocol converters also be implemented as a device having a distinct housing. This is in fact obvious for those skilled in the art from FIG. 3 and FIG. 4 illustrating the protocol converters 6 and 7. More specifically, each protocol converter is connected to the FC switch 44 through their respective FC interface units 17 and 22. And there is not used a special protocol out of standard used therein. Therefore each protocol converter may be connected to a general, existing FC switch 44 with a cable so that the protocol converters 6 and 7 may have their respective distinct and separate housing.

In accordance with the present invention, an online data migration method may be provided which may migrates data from a computer and existing storage system using a conventional interface such as SCSI to a new storage system using the FC and FC switch. When the old storage system is to be upgraded to anew storage system, any data used in the business processing so far may be continuously used without interruption. Furthermore, data usage may become possible during the online data migration in progress, allowing the interruption of business processing due to data migration to be minimized.

It is further understood by those skilled in the art that the foregoing description is a preferred embodiment of the disclosed device and that various changes and modifications may be made in the invention without departing from the spirit and scope thereof.

What is claimed is:

1. A data migration method, comprising the steps of:

disconnecting a connection between a computer performing data transfer by a first communication protocol and a first storage system performing data transfer by the first communication protocol;

connecting, through a first protocol converter, said computer to a switch connected to a second storage system performing data transfer by a second communication protocol;

connecting, through a second protocol converter, said switch to said first storage system; and migrating, through said switch, data stored in said first storage system into said second storage system, wherein said first and second protocol converters have a protocol converting function for converting the first communication protocol into the second communication protocol and vice versa, the second communication protocol into the first communication protocol.

2. A data migration method, comprising the steps of:

disconnecting a connection between a computer performing data transfer by a first communication protocol and a first storage system performing data transfer by the first communication protocol;

connecting, through a first protocol converter, said computer to a switch connected to a second storage system performing data transfer by a second communication protocol;

connecting, through a second protocol converter, said switch to said first storage system; and migrating, through said switch, data stored in said first storage system into said second storage system, wherein said first and second protocol converters have a protocol converting function for converting the first communication protocol into the second communication protocol and vice versa, the second communication protocol into the first communication protocol, wherein said first protocol converter has a first conversion function for converting a second identifier used by said second storage system that performs data transfer by the second communication protocol into a first identifier for performing data transfer by the first communication protocol, and a first translation table for converting between the first and the second identifiers, wherein said first protocol converter, said second protocol converter and said switch form a switching apparatus, wherein said switching apparatus performs data exchange by using the first conversion function so that said computer performing data transfer by the first communication protocol may handle said second storage system as a storage system using the first communication protocol, wherein a second protocol converter has a second conversion function for converting a third identifier used by the first storage system that performs data transfer by the first communication protocol into a fourth identifier for performing data transfer by the second communication protocol, and a second translation table for converting between the third and the fourth identifiers; and wherein said switching apparatus performs data exchange by using the second conversion function so that said second storage system performing data transfer by the second communication protocol may handle said first storage system as a storage system using the second communication protocol.

3. A data migration method according to claim 2, in which:
said step of migrating, through said switch, the data stored in said first storage system into said second storage system is executed by an online data migration facility provided to said second storage system.

4. A data migration method according to claim 2, in which:
said step of migrating, through said switch, the data stored in said first storage system into said second storage system is executed by an online data migration facility provided to said switch.

5. A data migration method according to any one of claims 2 through 4,
wherein said first storage system performing data transfer by the first communication protocol is a first disk drive performing data transfer by a first disk interface, and
said second storage system performing data transfer by the second communication protocol is a second disk drive performing data transfer by a second disk interface.

6. A data migration method according to claim 5, wherein:
said first disk interface is a SCSI protocol, and
said second disk interface is a fiber channel protocol.

7. A data migration method according to claim 1, in which said step of migrating, through said switch, the data stored in said first storage system into said second storage system is executed by an online data migration facility provided to said second storage system.

8. A data migration method according to claim 1, in which said step of migrating, through said switch, the data stored in said first storage system into said second storage system is executed by an online data migration facility provided to said switch.

9. A data migration method according to claim 1, wherein said first storage system performing data transfer by the first communication protocol is a first disk drive performing data transfer by a first disk interface, and
said second storage system performing data transfer by the second communication protocol is a second disk drive performing data transfer by a second disk interface.

10. A data migration method according to claim 9, wherein said first storage system performing data transfer by the first communication protocol is a first disk drive performing data transfer by a first disk interface, and
said second storage system performing data transfer by the second communication protocol is a second disk drive performing data transfer by a second disk interface.

11. A protocol converter for converting a first communication protocol to a second communication protocol and vice versa, comprising:
a first interface unit for performing data transfer with a first device using the first communication protocol;
a second interface unit for performing data transfer with a second device using the second communication protocol;
a processor for performing first conversion which converts data from said second interface unit to data in the first communication protocol to output the data in the first communication protocol through said first interface unit, and for performing second conversion which converts data from said first interface unit to data in the second communication protocol to output the data in the second communication protocol through said second interface unit; and
a translation table for protocol conversion,
wherein said processor performs said first conversion by converting a second identifier of said second device into a first identifier for performing data transfer by the first communication protocol, and performs said second conversion by converting a third identifier of said first device into a fourth identifier for performing data transfer by the second communication protocol and
wherein said translation table records the correspondence between the first and the second identifiers for said first conversion, and the correspondence between the third and the fourth identifiers for said second conversion.

12. A recording medium for storing a program for a protocol conversion which converts a first communication protocol to a second communication protocol and vice versa, the protocol conversion executed by a processor having a first interface unit for performing data transfer with a first device using the first communication protocol, a second interface unit for performing data transfer with a second device using the second communication protocol, and a translation table used for the protocol conversion,
wherein said program causes said processor to execute first conversion which converts data from said second interface unit into data in the first communication protocol to output the data in the first communication protocol through said first interface unit, and to execute second conversion which converts data from said first interface unit into data in the second communication protocol to output the data in the second communication protocol through said second interface unit, as well as to execute said first conversion by converting a second identifier of said second device into a first identifier for performing data transfer by the first communication protocol, and to execute said second conversion by converting a third identifier of said first device into a fourth identifier for performing data transfer by the second communication protocol, and
wherein said translation table records the correspondence between the first and the second identifiers for said first conversion as well as the correspondence between said third and the fourth identifiers for said second conversion.

13. A switching apparatus, comprising:
said protocol converter of claim 11 for converting the first communication protocol to the second communication protocol and vice versa, and
a switch operable in the second communication protocol for exchange, wherein
said switch is connected to the second interface unit of said protocol converter for performing data transfer with said second device using the second communication protocol.

14. A data migration method, comprising the steps of:
disconnecting a connection between a computer performing data transfer by a first communication protocol and a first storage system performing data transfer by the first communication protocol;
connecting, through a first protocol converter, said computer to a switch connected to a second storage system performing data transfer by a second communication protocol;

connecting, through a second protocol converter, said switch to said first storage system;

allocating, by said switch, an identifier allocated to said first storage system to said second storage system; and migrating, through said switch, data stored in said first storage system into said second storage system, wherein said first and second protocol converters have a protocol converting function for converting the first communication protocol into the second communication protocol and vice versa, the second communication protocol into the first communication protocol, wherein said switch transfers data including the identifier receiving from said computer to said second storage system.

15. A data migration method according to claim 14, in which said step of migrating, through said switch, the data stored in said first storage system into said second storage system is executed by an online data migration facility provided to said second storage system.

16. A data migration method according to claim 14, in which said step of migrating, through said switch, the data stored in said first storage system into said second storage system is executed by an online data migration facility provided to said switch.

17. A data migration method according to claim 16, wherein said first storage system performing data transfer by the first communication protocol is a first disk drive performing data transfer by a first disk interface, and said second storage system performing data transfer by the second communication protocol is a second disk drive performing data transfer by a second disk interface.

18. A data migration method according to claim 17, wherein said first disk interface is a SCSI protocol, and said second disk interface is a fiber channel protocol.

* * * * *